April 23, 1968   C. L. WELTNER   3,379,123
HAY BALER ATTACHMENT
Filed June 3, 1966   2 Sheets-Sheet 1

Inventor:
Corliss L. Weltner
By
Attorneys

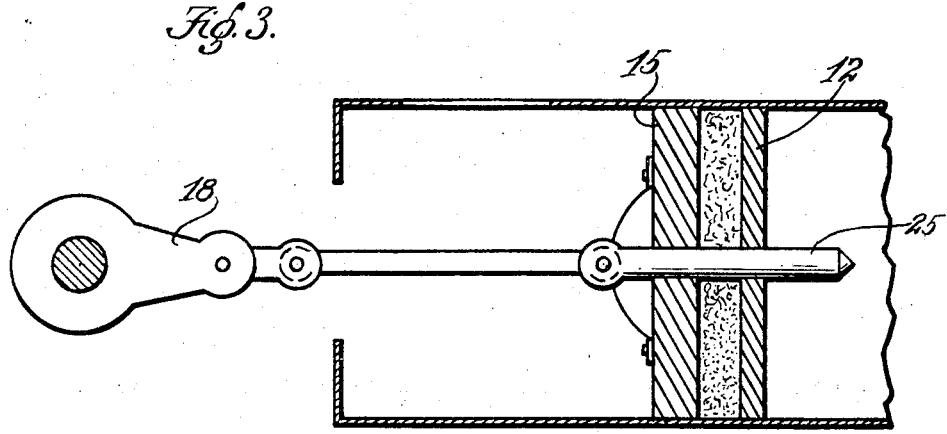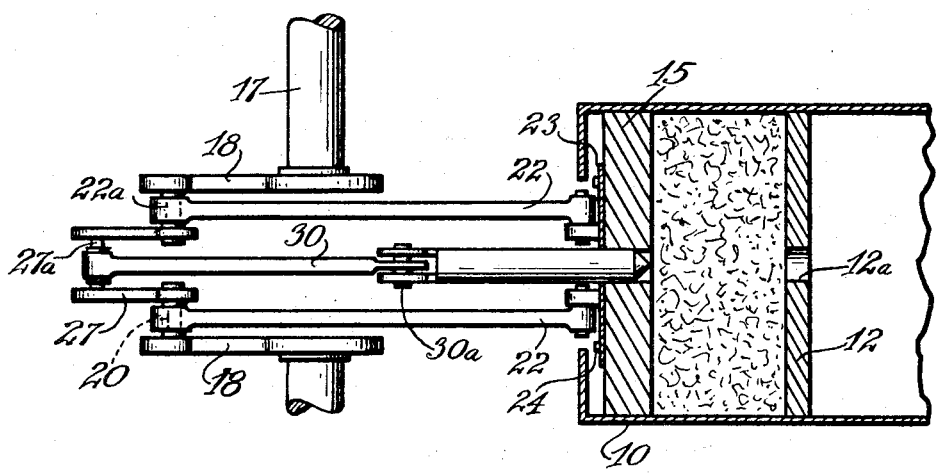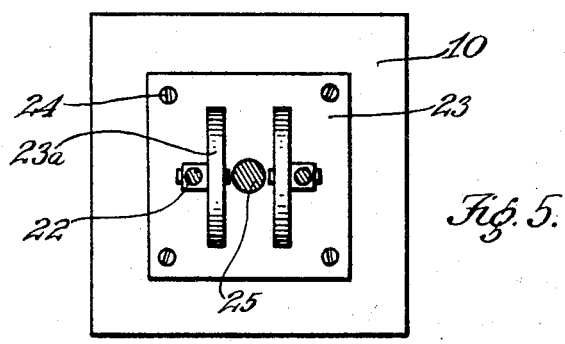

United States Patent Office 3,379,123
Patented Apr. 23, 1968

3,379,123
HAY BALER ATTACHMENT
Corliss L. Weltner, Rte. 3, Box 300,
Parkersburg, W. Va. 26101
Filed June 3, 1966, Ser. No. 555,038
3 Claims. (Cl. 100—98)

ABSTRACT OF THE DISCLOSURE

This invention relates to a hay baler having means to form a ventilating passage in the bale. The ventilating means comprises a piercing plunger which advances through an opening in the compression plunger and through an opening in a header. A bale of hay having an elongated opening therethrough is the final product of the baler.

My invention relates to conventional hay balers, and more particularly to means for forming a ventilating passage in the bale. Devices for this purpose usually employ a pressing plunger for packing the hay into baled form, and a piercing plunger to form the ventilating passage in the bale. Mechanisms have been designed to control the operations of these plungers in a manner to solidify the compressed bale to an extent where the ventilating passage will remain clear and deterioration in the interior of the bale prevented while it is stored or shipped. However, such mechanisms for this purpose as have come to my attention are quite involved and delicate, presenting problems of cost and doubtful efficiency. It is therefore one object of the present invention to provide a device for procuring the operation of the plungers under consideration which is simple in construction, positive in operation, and devoid of delicate parts.

A further object is to design a device of the above character which creates a fixed relation between the movements of the plungers with a view to form the ventilating passage in the bale as the latter is compressed into a semi-solid or self-sustaining form.

Another object is to design a compact driving unit combining controls for the plungers effective to advance them in the proper relation to accomplish the bale-compressing and passage-forming operations in an efficient manner.

An additional object is to design a device employing an assembly of rotary cranks for imparting the proper advancing movements to the plungers for accomplishing the compressing and forming operations referred to.

A final object is to mount the rotary crank assembly on a drive shaft for procuring the periodical advance of the plungers to combine forming the bale and the ventilating passage therein as hay is deposited into the baler.

A better understanding of the invention may be gained by reference to the accompanying drawings, in which—

FIG. 3 is a similar view showing the position of the parts of the device after the shaft has rotated a half-turn to procure the extreme advance of the plunger;

FIG. 4 is a top plan view of the showing in FIG. 1; and
FIG. 5 is a section on the line 5—5 of FIG. 1.

Figure 1:
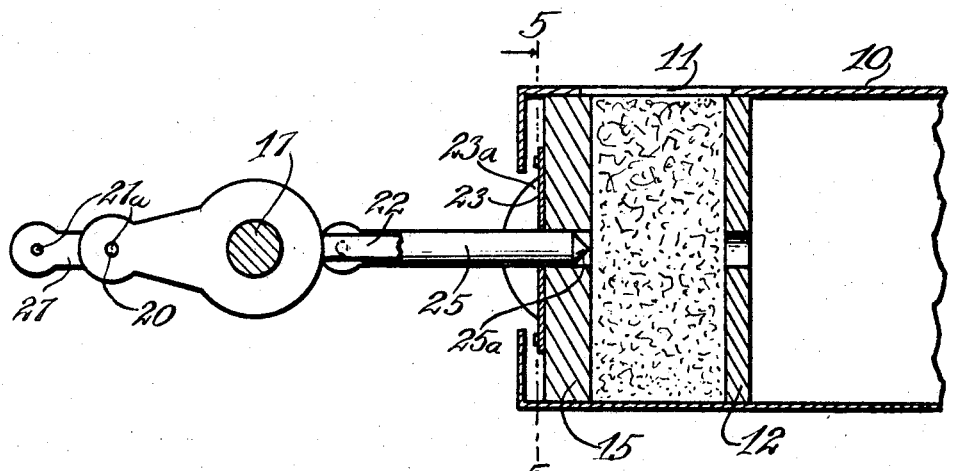
FIG. 1 is a schematic view of a typical baler housing in section and the novel compressing and ventilating device at the origin of its movement.

Referring specifically to the drawings, 10 denotes the housing of a typical baler press, 11 the opening for the deposit of hay, and 12 a header adapted to be backed from time to time by a suitable mechanism (not shown) to allow the formed bale to advance as more compressed hay is added at the rear.

As mentioned before, the element for compressing the hay in forward direction is the conventional plunger 15 whose form is usually square to fit slidably in the housing and conform to the shape of the bale to be formed therein. The plunger is designed for reciprocatory movement in the housing. According to the present invention, this movement is induced by the provision of a horizontal drive shaft 17 suitably journaled behind the housing 10. The shaft is divided at a medial point to be fitted with twin-cranks 18. These carry inward pins 20 for pivotally mounting the rear ends 22a of a pair of connecting rods 22 which extend in forward direction to a backing plate 23 carried by bolts or other suitable fastening means to the rear face of the plunger 15. The backing plate has ears 23a which carry aligned pivot pins 23b on which the front end portions of the connecting rods 22 are pivoted. It is thus apparent that the rotation of the drive shaft 17 will induce the reciprocatory motion of the plunger 15 in the housing 10.

The piercing plunger for the forming of the bale-ventilating feature is indicated at 25. It is lodged with its front end in the mid-section of the plunger 15; and such front end is pointed, as indicated at 25a. The plunger 25 is slidable in forward direction from the flush position indicated in FIG. 1; and the means to induce this motion is a short pair of cranks 27 situated between the cranks 18. The cranks 27 are mounted with inner ends rigidly on the pivot pins 20 to extend in radial alignment with the cranks 18; and the outer end portions of the cranks 27 are connected by a cross-pin 27a. A connecting rod 30 is mounted with one end to pivot on the cross-pin 27a; and the rod 30 extends to make a pivoting connection 30a with the rear end portion of the piercing plunger 25.

Figure 2:
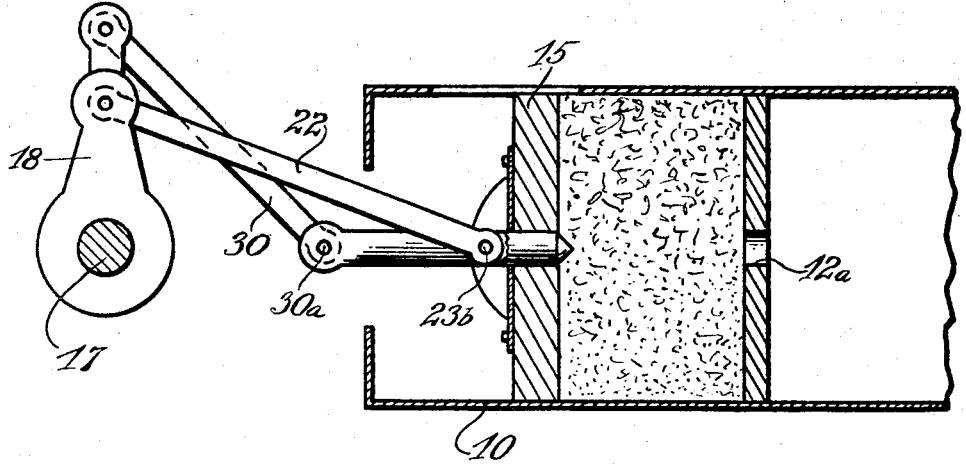
FIG. 2 is a similar view when the drive shaft has taken a quarter-turn to advance the plungers part-way.

It will now be apparent that, when the drive shaft 17 undergoes rotation in the direction indicated by the arrow in FIG. 1 to the extent of a quarter-turn, the plungers will advance on a content of hay deposited by way of the housing opening 11 with the effect of compressing the hay against the header 12; and the advance of the piercing plunger 25 will be faster than that of the plunger 15 because of the longer radius of the extended cranks 27 over that of the main cranks 18, so that the plunger 25 will project from the plunger 15 as seen in FIG. 2. This gives the pointed plunger 25 a lead to pierce the bale at a rate faster than that at which it is being compressed, and induces the formation of the ventilating passage therein. A further quarter-turn of the drive shaft 17 will procure the extreme travel of the plungers in the forward direction. During this travel the header 12 is backed as is the common practice to make room for the lengthening hay bale; and the faster advance of the piercing plunger 25 causes to it to penetrate the full length of the bale while it was being compressed to the semi-solid consistency; and the header 12 has a center hole 12a for receiving the forward end of the piercing plunger as shown.

The concurrent pressure on the stock of the bale—from the rear by the plunger 15 and from within by the plunger 25—packs the hay sufficiently not only to give it the body of a bale, but also to form a self-retaining wall around the center passage which will not shed loose hay or disintegrate into the passage when the plungers are retracted by the continued rotation of the drive shaft 17 to restore the plungers to their original positions. When this has occurred, the space behind the formed hay bale is filled with more hay and the above process repeated, the bale advancing periodically in the formed and continuously-perforated state as the header 12 is advanced.

It is the practice in hay balers not to move the header 12 forwardly until the incoming hay is compressed against it. FIG. 3 shows the body of hay compressed to this extent; and the novel mechanism has operated—concurrently with the compression of the hay—to extend the piercing plunger both through the body of compressed hay and a considerable distance through the header itself. In subsequent strokes as more hay is compressed and the header is moved automatically in forward direction by a conventional mechanism to formulate the length of the bale, the piercing plunger will not reach the header, but will always have passed through several of the previously compressed flakes time after time, or as long as they are within reach. Consequently, the repeated entry of the piercing plunger into the ventilating passage in the bale as it is being formulated will tend to keep the passage open and also strengthen the wall of the opening to prevent internal cave-in or collapse when the bale is handled or tied.

It is now apparent that the desirable condition of the formed hay bale is not attained by merely applying pressures where they are needed, but by joining pressures from the rear and center to pack the hay both throughout into bale form, and with a wall in the ventilating passage, as mentioned before. In addition, the faster advance of the piercing plunger is necessary in order that it may cover more ground while encountering light rather than dense resistance in the solidifying bale. Finally, these actions are accomplished by the use of a compact and positive drive which has a minimum of parts, repeats its functions by simple periodical driving impulses originating from a rotary shaft, and is devoid of any springs or other delicate parts or complications.

Having thus described my invention, what I claim is:

1. In a hay baler, means for compressing hay deposited into the baler against a header designed to advance periodically in order to accommodate the lengthening bale behind it, the header formed with a perforation, such means comprising a reciprocable compressing plunger effective on the advancing stroke to compress the bale from behind, a companion reciprocable piercing plunger effective on the advancing stroke to create a ventilating passage in the bale as it is being compressed by the compressing plunger, a drive for the plungers effective to operate them in the same directions to compress the bale and create said passage, whereby to increase the density of the bale both from behind and from within the passage and accelerate the advance of the piercing plunger to pass through said perforation as the compressing plunger compresses the bale against the header, said drive including a rotary crank for operating the compressing plunger, and a radial extension of the crank for operating the piercing plunger.

2. In a hay baler, means for compressing hay deposited into the baler against a heater designed to advance periodically in order to accommodate the lengthening bale behind it, the header formed with a perforation, such means comprising a reciprocable compressing plunger effective on the advancing stroke to compress the bale from behind, a companion reciprocable piercing plunger effective on the advancing stroke to create a ventilating passage in the bale as it is being compressed by the compressing plunger, a drive for the plungers effective to operate them in the same directions to compress the bale and create said passage, whereby to increase the density of the bale both from behind and from within the passage and accelerate the advance of the piercing plunger to pass through said perforation as the compressing plunger compresses the bale against the header, said drive comprising a pair of aligned sections of a rotary shaft with companion cranks carried at the inner ends of the sections, rods from the cranks connecting with the compressing plunger for operating the same, companion second cranks extending radially from the first-named cranks, and a rod connecting the second cranks with the piercing plunger for operating the latter.

3. The structure of claim 2, and inwardly extending cross pins carried by said first mentioned cranks and pivotally supporting said compressing plunger-operating rods, said second cranks extending radially from said cross pins, another cross pin connecting said second cranks, and the piercing plunger-operating rod pivoted on said last mentioned cross pin.

References Cited
UNITED STATES PATENTS

| | | | |
|---|---|---|---|
| 860,284 | 7/1907 | Deaton | 100—98 |
| 1,045,125 | 11/1912 | Dain | 100—98 |
| 2,420,923 | 5/1947 | West | 100—98 |
| 3,022,723 | 2/1962 | Templeton | 100—98 |

BILLY J. WILHITE, *Primary Examiner.*